United States Patent Office 3,479,376
Patented Nov. 18, 1969

3,479,376
PROCESS FOR THE PREPARATION OF 17-SUBSTITUTED - 13 - ALKYLGONA - 1,3,5(10),6,8-PENTAENES
George C. Buzby, Jr., Philadelphia, Robert C. Smith, King of Prussia, and Herchel Smith, Wayne, Pa., assignors to American Home Products Corporation, New York, N.Y., a corporation of Delaware
No Drawing. Filed July 7, 1967, Ser. No. 651,703
Int. Cl. C07c *167/14, 169/08;* A61k *17/00*
U.S. Cl. 260—397.45                8 Claims

ABSTRACT OF THE DISCLOSURE 17-substituted-13-alkylgona-1,3,5(10),6,8-pentaenes (I) are prepared by a process comprising dehydrogenating with a noble metal catalyst and, optionally, a hydrogen acceptor, an appropriately substituted gona-1,3,5(10),8-tetraene. With 17-hydroxymethylene-substituted starting materials, 14β-gona-1,3,5(10),6,8-pentaen-17-ones are formed in all cases. With other 17-substituted tetraenes, the 14β-pentaene is formed in the absence of, and the 14α-pentaene is formed in the presence of, a hydrogen acceptor. Compounds I, particularly equilenin, are useful estrogenic agents.

---

This invention relates to a novel process for preparing 17-substituted-13-alkylgona-1,3,5(10),6,8 - pentaenes. In particular, it concerns the dehydrogenation of the corresponding 17 - substituted-13-alkylgona-1,3,5(10),8-tetraenes to form the said therapeutically-useful pentaenes and, particularly, equilenin.

The compounds prepared by the process of the instant invention are those of Formula I:

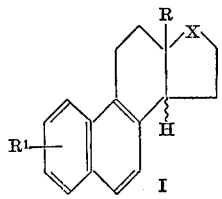

wherein
R is lower alkyl;
$R^1$ is lower alkyl, lower alkoxy, monocarbocyclic aryloxy, lower alkanoyloxy or lower cycloalkyloxy;
X is carbonyl, ketalized carbonyl, lower alkylhydroxymethylene, lower alkenylhydroxymethylene or lower alkynylhydroxymethylene; and the symbol ($\ddagger$) indicates α- or β-configuration.

In this specification and in the appended claims the terms "lower alkyl," "lower alkenyl" and "lower alkynyl" refer to the respective groups containing from about 1 (or 2 as the case may be) up to about 6 carbon atoms; the terms "lower alkoxy" and "lower cycloalkyloxy" refers to those groups derived, by removal of a hydrogen atom, from alcohols, aliphatic and alicyclic having up to about 6 carbon atoms; the term "lower alkanoyloxy" refers to those groups derived from alkane carboxylic acids having up to about 6 carbon atoms; the term "monocarboxylic aryloxy" refers to groups derived from phenol and phenol substituted with lower alkyl, lower alkoxy and like groups; the term "ketalized carbonyl" refers to carbonyl converted to a 5 or 6 membered ketal ring by reaction with an appropriate glycol. Illustrative lower alkyl groups, therefore, are methyl, ethyl, n-propyl, n-butyl, n-pentyl, n-hexyl, 3-methylpentyl, and the like; illustrative of lower alkoxy and lower cycloalkoxy groups are methoxy, ethoxy, isopropoxy, tetrahydropyranyloxy, cyclopropyloxy, cyclopentyloxy, and the like; illustrative lower alkanoyloxy groups are acetoxy, propionyloxy, butyroyloxy, 3-methylpentanoyloxy, and the like; illustrative monocarbocyclic aryloxy groups are phenoxy, p-methylphenoxy, p-methoxyphenoxy, and the like; illustrative ketalized carbonyl groups are ethylenedioxy ketals and propylenedioxy ketals. Preferably group R is methyl or ethyl and group $R^1$ is fixed in the 3-position.

The instant invention in its broadest aspect contemplates in essence: a process for the preparation of gonapentaene steroid of the formula:

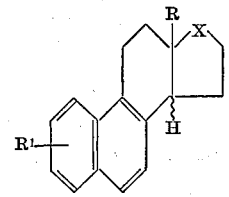

wherein
R is lower alkyl;
$R^1$ is lower alkyl, lower alkoxy, monocarbocyclic aryloxy, lower alkanoyloxy or lower cycloalkyloxy;
X is carbonyl, ketalized carbonyl, lower alkylhydroxymethylene, lower alkenylhydroxymethylene or lower alkynylhydroxymethylene; and the symbol ($\ddagger$) indicates α- or β-configuration, which process comprises either
(a) dehydrogenating with a noble metal catalyst a gona-tetraene steroid of the formula:

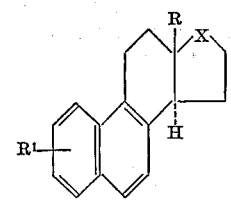

wherein R, $R^1$ and X are as above defined until conversion to a 14β-pentaene of the formula:

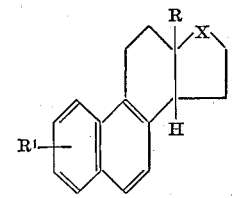

wherein R, $R^1$ and X are as above defined, is substantially complete and recovering said pentaene;
(b) dehydrogenating with a noble metal catalyst a gonatetraene steroid of the formula:

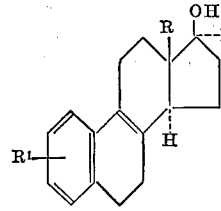

wherein R and R¹ are as hereinabove defined until conversion to a 14β-petaene of the formula:

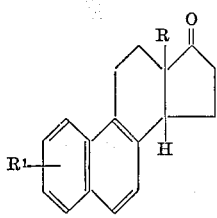

wherein R and R¹ are as above defined, is substantially complete and recovering said pentaene; or (c) dehydrogenating with a noble metal catalyst in the presence of a hydrogen acceptor a gonatetraene steroid of the formula:

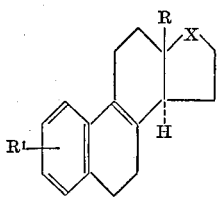

wherein R, R¹ and X are as hereinabove defined until conversion to a 14α-pentaene of the formula:

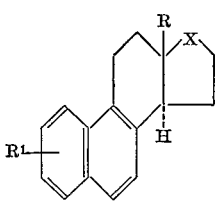

wherein R, R¹ and X are as above defined, is subtsantially complete and recovering said pentaene.

Two especially valuable embodiments comprise, respectively a process as defined above wherein the said noble metal catalyst is palladium and a process above wherein the hydrogen acceptor in embodiment (c) is methyl cinnamate. Both embodiments provide especially good yields of the desired products rapidly and in a good state of purity.

Among the embodiments of this invention special mention is made of the following processes:

A process as defined above wherein, by the procedure of embodiment (c), (±)-13-methyl-3-methoxygona-1,3,5(10),8-tetraen-17-one is dehydrogenated with palladium in the presence of methyl cinnamate to form (±)-13-methyl-3-methoxygona-1,3,5(10),6,8-pentaen-17-one.

A process as defined above wherein, by the procedure of embodiment (c), (±)-13-ethyl-3-methoxygona-1,3,5(10),8-tetraen-17-one is dehydrogenated with palladium in the presence of methyl cinnamate to form (±)-13-ethyl-3-methoxygona-1,3,5(10),6,8-pentaen-17-one.

A process as defined above wherein, by the procedure of embodiment (a), (±)-13-ethyl-3-methoxygona-1,3,5(10),8-tetraen-17-one is dehydrogenated with palladium to form (±)-13-ethyl-3-methoxy-14β-gona-1,3,5(10),6,8-pentaen-17-one.

A process as defined above wherein, by the procedure of embodiment (b), (+)-13-methyl-3-methoxygona-1,3,5(10),8-tetraen-17β-ol is dehydrogenated with palladium in the presence of methyl cinnamate to form (+)-13-methyl-3-methoxy-14β-gona-1,3,5(10),6,8-pentaen-17-one.

A process as defined above wherein, by the procedure of embodiment (b), (±)-13-ethyl-3-methoxygona-1,3,5(10),8-tetraen-17β-ol is dehydrogenated with palladium to form (±)-13-ethyl-3-methoxy-14β-gona-1,3,5(10),6,8-pentaen-17-one.

A process as next above defined wherein said dehydrogenation is carried out in the presence of methyl cinnamate.

Those skilled in the art will at once recognize that if the process as defined above is carried out so as to provide a compound of Formula I wherein R¹ is 3-hydroxy, R is methyl, X is keto, and the 14-hydrogen atom is α-oriented, there is obtained the very valuable estrogenic substance equilenin.

In considering the teaching herein, those skilled in the art will see that, in general, gonatetraenes are converted to gonapentaenes by dehydrogenation using a noble metal catalyst, such as for example, a member of the platinum or palladium family of the periodic system, illustrative members of which are ruthenium, rhodium, palladium, rhenium, osmium, platinum, and the like, preferably palladium, with or without the presence of a hydrogen acceptor usually an unsaturated organic compound such as an unsaturated acid, e.g., crotonic acid, sorbic acid, fumaric or maleic acid, or an ester such as an alkyl ester of an acid, especially methyl cinnamate or an anhydride such as maleic anhydride, and the like. Furthermore, if X is hydroxymethylene; this group is converted by the process of the invention to a carbonyl group. If a hydrogen acceptor, such as methyl cinnamate is used, the gonapentaene obtained has the hydrogen at the 14-position in the α-configuration (normal), except when X is hydroxymethylene when the 14β-product is produced. In the absence of such an acceptor the product obtained has the hydrogen at the 14-position in the β-(or iso-) position. Even then when X is hydroxymethylene, and a hydrogen acceptor is used, the 14β-product is obtained.

Subsequent conversions of one 17-substituent to another, each compound being within the scope of Formula I, are contemplated to be embodiments of this invention and are not departures from the spirit thereof if the reactant is prepared by the instant process. Thus, for example, as will be obvious to those skilled in the art, a compound of Formula I wherein X is keto can be prepared by the instant dehydrogenation process, then X can be converted by entirely conventional methods to ketalized carbonyl, e.g., by reaction with a ketalizing agent, such as ethylene glycol; and to lower alkylhydroxymethylene, lower alkenylhydroxymethylene, and lower alkynylhydroxymethylene, e.g., by reaction with an appropriate reagent, such as a metallic derivative of an alkyl, alkenyl or alkynyl compound.

The dehydrogenation reaction in embodiments (a), (b) or (c) is effected by mixing the appropriate 17-substituted-gona-1,3,5(10),8-tetraene with a noble metal catalyst, preferably palladium and preferably a form of palladium well know to those skilled in the art as from 2 to 20%, especially about 5% palladium on charcoal, which is readily available commercially, or which can easily be prepared in known ways. It is especially convenient to use about an 5% by weight (calculated as noble metal) of catalyst, based on the weight of the steroid to be dehydrogenated. The reaction proceeds smoothly if the mixture of steroid and catalyst is suspended in an inert solvent, especially a high boiling paraffin, such as n-octane or an aromatic hydrocarbon such as benzene, toluene, xylene, p-cymene and the like and the mixture then is heated at a temperature of from about 80° C. to about 200° C. for from about one-half to about five, preferably from about 1 to about 2 hours. After the dehydrogenation is complete, the resulting product of Formula I is obtained by conventional methods such as, for example, filtration, concentration of the filtrate and crystallization of the residue from a suitable solvent, such as a lower alkanol, for example, methanol or ethanol. One especially useful method of carrying out the instant process is to mix about 1 gram of the tetraene with 40 ml. of p-cymene and to add 1.0 g. of 5% palladium on carbon and, if desired, about 1.65 g. of methyl cinnamate. This mixture is refluxed for about 1.5 hours in a nitrogen atmosphere, then it is cooled and filtered through filter aid, the filter cake being washed with toluene. The filtrate is distilled in a vacuum leaving the product as a residue. This can be further purified, if desired, by recrystallization from methanol.

The time and temperature ranges used in describing the aforementioned dehydrogenation reaction simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time.

The 17-substituted-13-alkylgona - 1,3,5(10)-8-tetraene starting materials for the process of the present invention may be prepared by the processes described by Douglas, Graves, Hartley, Hughes, McLoughlin, Siddall and Smith in J. Chem. Soc., 1963, pages 5077–94. For example 13-methyl-3-methoxygona-1,3,5-(10),8-tetraen-17-ol or -one can be prepared by hydrogenation of the corresponding gona-1,3,5(10),8,14-pentaene which itself can be obtained by cyclodehydration of the corresponding 9,10,8(14)-bis-secogona-1,3,5(10)-triene-9,14,17-trione. Other tetraenes can be prepared by entirely analogous procedures and, if required, the 17-ketalized carbonyl group is introduced by conventional ketalization procedures and the 17-lower alkylhydroxymethylene, -lower alkenylhydroxymethylene and -lower alkynyl hydroxymethylene groups are introduced by alkylation in a known manner.

The 17-substituted-13 - alkylgona - 1,3,5(10),6,8-pentaenes (I), especially the 13-alkylgona-1,3,5(10),6,8-pentaen-17-ols and -ones made by the process of this invention, as indicated above, have estrogenic activity. This makes them useful to treat conditions in mammals responsive to treatment with estrogenic drugs. Among such conditions are, for example, menopause, senile vaginitis, kraurosis vulvae, pruritus vulvae and the like. They are also useful as intermediates for the preparation of other steroids with hormone and other activities.

In the product of a total synthesis which has not included a suitable resolution stage the compounds of the invention, which have the 13β-configuration, will be present in equimolecular mixture or racemate form with the corresponding 13α-enantiomorphs. The racemates are designated (±)-13β-compounds using the Horeau-Reichstein Convention approved by Fieser and Fieser, "Steroids," p. 336 (1959), in which the enantiomer of 13β-configuration is considered as the d-form and its antipode, the enantiomer of the 13β-configuration, is designated the 1-13β-form so that the racemate is the d,1-13β-or (±)-13β-compound.

The products of Formula I of this invention can be used in association with a pharmaceutically acceptable carrier. They can be formulated in liquid or solid forms, for instance as capsules, tables, suppositories, powders, dispersable granules, cachets and the like by combining them with conventional carriers. Such conventional carriers include magnesium carbonate or stearate, talc, sugar, lactose, pectin, dexdrin, starch, gelatin, tragacanth, methyl cellulose, sodium carboxymethyl cellulose, low melting wax and cocoa butter. Diluents, flavoring agents, solubilizers, lubricants, suspending agents, binders or tablet-disintegrating agents can be used. Powders or tablets preferably contain 5 or 10 to 99% of the active constituent. The active steroid can be formulated with an encapsulating material with or without other carriers.

Liquid preparations such as solutions, suspensions or emulsions can also be used. Such preparations include dispersions in a pharmaceutically acceptable carrier such as arachis oil or sterile water, preferably containing a non-ionic surface active agent such as fatty acid esters of polyhydroxy compounds, e.g. sorbitan, aqueous starch in sodium carboxymethyl cellulose solutions, aqueous propylene glycol or polyethylene glycol. Thus a water-propylene glycol solution can be used for parenteral injection and aqueous suspensions suitable for oral use can be made by utilizing natural or synthetic gums, resins, methyl cellulose or other well known suspending agents.

The compounds can be in unit dose form in which the dose unit is for instance from about 1 to about 200 mg. of each active steroid depending on the type of therapeutic desired. The unit dose form can be a packaged composition, e.g. packeted powder, vials or ampuls, or, for example, in the form of capsules, cachets or tablets or any number of these in packaged form. The pharmaceutical compositions can also consist substantially solely of the active steroid when this is in unit dose form.

Equilenin, one of the products prepared by the instant process, is useful at a level of 1.25 mg. daily, orally, in menopausal syndrome and from 1.25 to 3.75 mg. or more, daily, for senile vaginitis, kraurosis vulvae and pruritis vulvae, depending on the tissue response of the individual.

DESCRIPTION OF THE PREFERRED EMBODIMENTS

The following examples are given by way of illustration and are not to be construed as limitations of this invention, variations of which are possible without departing from the scope and spirit thereof.

EXAMPLE 1

(±)-13-methyl-3-methoxygona-1,3,5(10),6,8-pentaen-17-one (±)-13-methyl-3-methoxygona - 1,3,5(10),8 - tetraen-17-one, 1.0 g. in 40 ml. of p-cymene admixed with 1.0 g. of 5% palladium on carbon and 1.65 g. of methyl cinnamate is refluxed with stirring in a nitrogen atmosphere for 1.5 hours. The resulting mixture is filtered through filter aid, the filter cake being washed with toluene. The filtrate is distilled under diminished pressure and the residual amorphous solid is triturated with methanol to provide 0.5 g. of product of 95% purity, M.P., 179–182° C.

Further recrystallization from methanol provides the pure product (0.365 g.)

M.P. 182–185°C. $\lambda_{max.}^{KBr}$ 3.46, 5.79, 6.18 and 6.27 $\mu$. $\lambda_{max.}^{EtOH}$ 231 m$\mu$ ($\epsilon$ 51,600), 260 ($\epsilon$ 9,200), 278 ($\epsilon$ 5,400), 289 ($\epsilon$ 4,600), 320 ($\epsilon$ 1,600), 336 ($\epsilon$ 2,200).

EXAMPLE 2

(±)-13-ethyl-3-methoxygona-1,3,5(10),6,8-pentaen-17-one (±) - 13 - ethyl-3-methoxygona-1,3,5(10),8-tetraen-17-one, 1.0 g., in 40 ml. of p-cymene and 1.65 g. of methyl cinnamate containing 1.0 g. of 5% Pd/C (palladium on carbon) is refluxed with stirring under nitrogen for 75 minutes. Filtration thru filter aid, washing of the cake with toluene and concentration under high vacuum provides a residue which is dissolved in benzene and filtered through neutral alumina containing 10% silver nitrate by weight. Removal of solvent and recrystallization of the residue from methanol provides 0.190 g. of crude product, M.P. 173–179° C. A second recrystallization from methanol provides the product, 0.160 g., M.P., 175–179° C.; $\lambda_{max.}^{KBr}$ 3.48, 5.78, 6.15, 6.24 $\mu$; $\lambda_{max.}^{EtOH}$ 231 m$\mu$ ($\epsilon$ 57,600) 260 m$\mu$ ($\epsilon$ 6,850), 278 m$\mu$ (5,400), 289 m$\mu$ ($\epsilon$ 4,200) 321 m$\mu$ ($\epsilon$ 1,600), 337 m$\mu$ ($\epsilon$ 2,200).

EXAMPLE 3

(±)-13-ethyl-3-methoxy-14β-gona-1,3,5(10),6,8-pentaen-17-one (±) - 13 - ethyl - 3-methoxygona-1,3,5(10),8-tetraen-17-one, 1.0 g., in 40 ml. of p-cymene admixed with 1.0 g. of 5% palladium on carbon is refluxed with stirring in a nitrogen atmosphere for 75 minutes. The resulting mixture is filtered through filter aid, the filter cake being washed with toluene. The filtrate is distilled under diminished pressure. Crystallization of the residual gum from methanol affords pure product, 0.7 g., M.P., 124–127° C. $\lambda_{max.}^{KBr}$ 3.45, 5.79, 6.16 and 6.24 $\mu$, $\lambda_{max.}^{EtOH}$ 229 m$\mu$ ($\epsilon$ 59,500), 263 ($\epsilon$ 5,200), 273 ($\epsilon$ 5,200), 284 ($\epsilon$ 3,000), 319 ($\epsilon$ 1,500) and 334 ($\epsilon$ 1,850).

Further structure proof is provided by treating this (±)-13 - ethyl - 3 - methoxy-14$\beta$-gona-1,3,5(10),6,8-pentaen-17-one, 0.7 g., with an aqueous mixture of 53 ml. of acetic acid and 79 ml. of hydrochloric acid at reflux in a nitrogen atmosphere for 17 hours. This solution is cooled and the resulting crystalline solid collected to obtain (±)-13-ethyl - 3 - hydroxy-14$\beta$-gona-1,3,5(10),6,8-pentaen-17-one (0.6 g.) M.P., 221–224° C. Recrystallization from ethanol affords the analytical sample of the demethylated product (0.5 g.)

M.P. 221–224° C. $\lambda_{max.}^{KBr}$ 3.1, 5.87, 6.15 and 6.23 $\mu$; $\lambda_{max.}^{EtOH}$ 228 m$\mu$ ($\epsilon$ 60,500), 265 ($\epsilon$ 5,400), 276 ($\epsilon$ 5,700), 288 ($\epsilon$ 3,400), 323 ($\epsilon$ 2,100), 336 ($\epsilon$ 2,300).

*Analysis.*—Calcd. for $C_{19}H_{20}O_2$: C, 81.39; H, 7.19. Found: C, 81.21; H, 6.97.

EXAMPLE 4

(+)-13-methyl-3-methoxy-14$\beta$-gona-1,3,5(10),6,8-pentaen-17-one (+) - 13-methyl - 3-methoxygona-1,3,5(10),8-tetraen-17$\beta$-ol, 1.0 g., in 40 ml. of p-cymene admixed with 1.0 g. of 5% palladium on carbon and 1.65 g. of methyl cinnamate is refluxed with stirring in a nitrogen atmosphere for 1.5 hours. The resulting mixture is filtered through filter aid, the filter cake washed with toluene. The filtrate is distilled under diminished pressure and the residual gum was crystallized by trituration with methanol to provide 0.465 g. of the product of 75% purity, M.P. 75–90° C.

Recrystallization from methanol then affords the pure product.

EXAMPLE 5

(±)-13-ethyl-3-methoxy-14$\beta$-gona-1,3,5(10),6,8-pentaen-17-one (±) - 13 - ethyl - 3-methoxygona-1,3,5(10),8-tetraen-17$\beta$-ol, 1.0 g. in 40 ml. of p-cymene admixed with 1.0 g. of 5% palladium on carbon and 1.65 g. of methyl cinnamate is refluxed with stirring in a nitrogen atmosphere for 1.5 hours. The resulting mixture is filtered through filter aid, the filter cake washed with toluene. The filtrate is distilled under diminished pressure and the residual gum is triturated with methanol to provide 0.61 g. of the product of 85% purity, M.P. 80–110° C.

Recrystallization from methanol affords the pure product, 0.415 g.,

M.P., 125–128° C. $\lambda_{max.}^{KBr}$ 3.5, 5.8, 6.19 and 6.26 $\mu$. $\lambda_{max.}^{EtOH}$ 229 m$\mu$ ($\epsilon$ 57,000), 262 ($\epsilon$ 5,700), 274 ($\epsilon$ 5,700), 318 ($\epsilon$ 1,600), 334 ($\epsilon$ 2,000).

EXAMPLE 6

(±)-13-ethyl-3-methoxy-14$\beta$-gona-1,3,5(10),6,8-pentaen-17-one (±) - 13 - ethyl - 3-methoxygona-1,3,5(10),8-tetraen-17$\beta$-ol, 1.0 g., in 40 ml. of p-cymene admixed with 1.0 g. of 5% palladium on carbon is refluxed with stirring in a nitrogen atmosphere for 1.5 hours. The resulting mixture is filtered through filter aid, the filter cake being washed with toluene. The filtrate is distilled under diminished pressure and the residual gum is triturated with methanol to provide 0.6 g. of crude product M.P. 119–122° C.

Recrystallization from methanol yields pure product, 0.48 g.,

M.R., 123–126°C. $\lambda_{max.}^{KBr}$ 3.46, 5.79, 6.18 and 6.26 $\mu$. $\lambda_{max.}^{EtOH}$ 229 m$\mu$ ($\epsilon$ 60,700), 262 ($\epsilon$ 5,350), 273 ($\epsilon$ 5,350), 318 ($\epsilon$ 1,500), 334 ($\epsilon$ 2,100).

EXAMPLE 7

The procedure of Example 1 is repeated, substituting for 13-methyl-3-methoxygona-1,3,5(10)-8-tetraen-17-one, stoichiometrically-equivalent amounts of the following tetraenes:

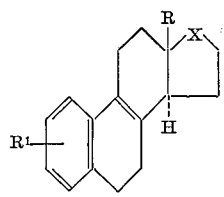

| R | R1 | X |
|---|----|---|
| $CH_3$ | 3-$OCH_3$ | $C\underset{O-}{\overset{O-}{<}}$ |
| $CH_3$ | 3-$OCH_3$ | $C(OH)CH_3$ |
| $CH_3$ | 3-$OCH_3$ | $C(OH)CH=CH_2$ |
| $CH_3$ | 3-$OCH_3$ | $C(OH)C\equiv CH$ |
| $CH_3$ | 3-$CH_3$ | C=O |
| $CH_3CH_2CH_3$ | 3-$OCH_3$ | C=O |
| $CH_2(CH_2)_2CH_3$ | 3-$OCH_3$ | C=O |
| $CH_3$ | 2-$OCH_3$ | C=O |
| $CH_3$ | 1-$OCH_3$ | C=O |
| $CH_3$ | 4-$OCH_3$ | C=O |
| $CH_3$ | 3-phenoxy | C=O |
| $CH_3$ | 3-$CH_3CO_2$ | C=O |
| $CH_3$ | 3-$CH_3CH_2CO_2$ | C=O |
| $CH_3$ | 3-O-◁ | C=O |
| $CH_3$ | 3-O-⬠ | C=O | and the following 14$\alpha$-pentaenes are obtained:

| R | R1 | X |
|---|----|---|
| $CH_3$ | 3-$OCH_3$ | $C\underset{O-}{\overset{O-}{<}}$ |
| $CH_3$ | 3-$OCH_3$ | $C(OH)CH_3$ |
| $CH_3$ | 3-$OCH_3$ | $C(OH)CH=CH_2$ |
| $CH_3$ | 3-$OCH_3$ | $C(OH)C\equiv CH$ |
| $CH_3$ | 3-$CH_3$ | C=O |
| $CH_2CH_2CH_3$ | 3-$OCH_3$ | C=O |
| $CH_2(CH_2)_4CH_3$ | 3-$OCH_3$ | C=O |
| $CH_3$ | 2-$OCH_3$ | C=O |
| $CH_3$ | 1-$OCH_3$ | C=O |
| $CH_3$ | 4-$OCH_3$ | C=O |
| $CH_3$ | 3-phenoxy | C=O |
| $CH_3$ | 3-$CH_3CO_2$ | C=O |
| $CH_3$ | 3-$CH_3CH_2CO_2$ | C=O |
| $CH_3$ | 3-O-◁ | C=O |
| $CH_3$ | 3-O-◁ | C=O |

EXAMPLE 8

The procedure of Example 3 is repeated, substituting for 13 - ethyl-3-methoxygona-1,3,5(10)-8-tetraen-17-one stoichiometrically equivalent amounts of the tetraenes tabulated in Example 7 and the following 14-β-pentaenes are obtained:

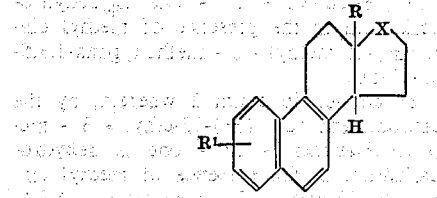

| R | R¹ | X |
|---|---|---|
| CH₃ | 3—OCH₃ | C<O—O (cyclic ketal) |
| CH₃ | 3—OCH₃ | C(OH)CH₃ |
| CH₃ | 3—OCH₃ | C(OH)CH=CH₂ |
| CH₃ | 3—OCH₃ | C(OH)C≡CH |
| CH₃ | 3—CH₃ | C=O |
| CH₂CH₂CH₃ | 3—OCH₃ | C=O |
| CH₂(CH₂)₄CH₃ | 3—OCH₃ | C=O |
| CH₃ | 2—OCH₃ | C=O |
| CH₃ | 1—OCH₃ | C=O |
| CH₃ | 4—OCH₃ | C=O |
| CH₃ | 3-phenoxy | C=O |
| CH₃ | 3—CH₃CO₂ | C=O |
| CH₃ | 3—CH₃CH₂CO₂ | C=O |
| CH₃ | 3—O—△ | C=O |
| CH₃ | 3—O—⬠ | C=O |

EXAMPLE 9

The procedure of Example 6 is repeated, substituting for the 13-ethyl-3-methoxygona-1,3,5(10),8-tetraen-17β-ol, stoichiometrically-equivalent amounts of the following tetraenes:

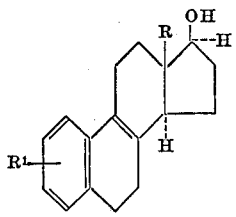

| R | R¹ |
|---|---|
| CH₃ | 3-CH₃ |
| CH₂CH₂CH₃ | 3-OCH₃ |
| CH₂(CH₂)₄CH₃ | 3-OCH₃ |
| CH₃ | 2-OCH₃ |
| CH₃ | 1-OCH₃ |
| CH₃ | 4-OCH₃ |
| CH₃ | 3-phenoxy |
| CH₃ | 3-CH₃CO₂ |
| CH₃ | 3-CH₃CH₂CO₂ |
| CH₃ | 3-O—△ |
| CH₃ | 3-O—⬠ | and the following 14β-pentaen-17-ones are obtained:

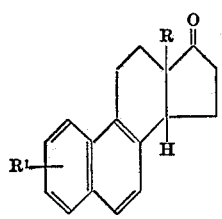

| R | R¹ |
|---|---|
| CH₃ | 3-CH₃ |
| CH₂CH₂CH₃ | 3-OCH₃ |
| CH₂(CH₂)₄CH₃ | 3-OCH₃ |
| CH₃ | 2-OCH₃ |
| CH₃ | 1-OCH₃ |
| CH₃ | 4-OCH₃ |
| CH₃ | 3-phenoxy |
| CH₃ | 3-CH₃CO₂ |
| CH₃ | 3-CH₃CH₂CO₂ |
| CH₃ | 3-O—△ |
| CH₃ | 3-O—⬠ |

The procedure is repeated, using methyl cinnamate, as in Example 4; substantially the same results are obtained.

We claim:
1. A process for the preparation of a gonapentaene steroid of the formula:

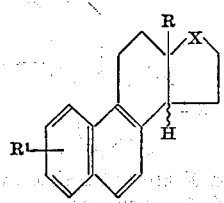

wherein

R is lower alkyl;
R¹ is lower alkyl, lower alkoxy, monocarbocyclic aryloxy, lower alkanoyloxy or lower cycloalkyloxy;
X is carbonyl, ketalized carbonyl, lower alkylhydroxymethylene, lower alkenylhydroxymethylene or lower alkynylhyroxymethylene; and the symbol (ξ) indicates α- or β-configuration, which process comprises either (a) dehydrogenating with a noble metal catalyst, which is a member of the platinum or palladium family of the periodic system, a gonatetraene steroid of the formula:

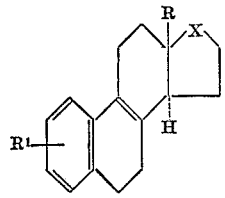

wherein R, R¹ and X are as above defined to form a 14β-pentaene of the formula:

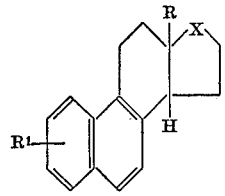

wherein R, R¹ and X are as above defined, and recovering said pentaene;

(b) dehydrogenating with a noble metal catalyst as defined above a gonatetraene steroid of the formula:

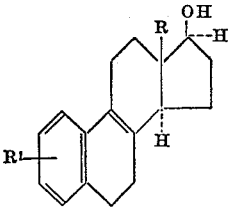

wherein R and R¹ are as hereinabove defined to form a 14β-pentaene of the formula:

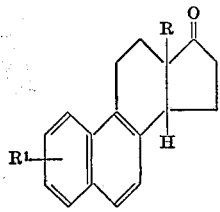

wherein R and R¹ are as above defined, and recovering said pentaene; or (c) dehydrogenating with a noble metal catalyst as defined above in the presence of a hydrogen acceptor a gonatetraene steroid of the formula:

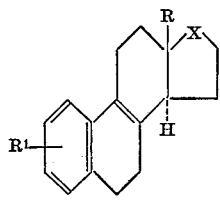

wherein R, R¹ and X are as hereinabove defined to form a 14α-pentaene of the formula:

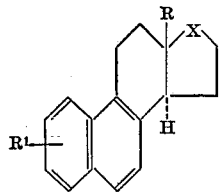

wherein R, R¹ and X are as above defined, and recovering said pentaene.

2. A process as defined in claim 1 wherein said noble metal catalyst is palladium.

3. A process as defined in claim 1 wherein the hydrogen acceptor in embodiment (c) is methyl cinnamate.

4. A process as defined in claim 1 wherein, by the procedure of emobodiment (c), (±)-13-methyl-3-methoxygona-1,3,5(10),8-tetraen - 17 - one is dehydrogenated with palladium in the presence of methyl cinnamate to form (±)-13-methyl - 3 - methoxygona-1,3,5-(10),6,8-pentaen-17-one.

5. A process as defined in claim 1 wherein, by the procedure of embodiment (c), (±)-13-ethyl - 3 - methoxygona-1,3,5(10),8-tetraen - 17 - one is dehydrogenated with palladium in the presence of methyl cinnamate to form (±)-13-ethyl - 3 - methoxygona-1,3,5-(10),6,8-pentaen-17-one.

6. A process as defined in claim 1 wherein, by the procedure of embodiment (a), (±)-13-ethyl - 3 - methoxygona-1,3,5(10),8-tetraen - 17 - one is dehydrogenated with palladium to form (±)-13-ethyl - 3 - methoxy-14β-gona-1,3,5(10),6,8-pentaen-17-one.

7. A process as defined in claim 1 wherein, by the procedure of (b), (+)-13-methyl - 3 - methoxygona-1,3,5(10),8-tetraen-17β-ol is dehydrogenated with palladium in the presence of methyl cinnamate to form (+)-13-methyl-3-methoxy-14β-gona - 1,3,5(10),6, 8-pentaen-17-one.

8. A process as defined in claim 1 wherein, by the procedure of embodiment (b), (±)-13 - ethyl - 3 - methoxygona-1,3,5(10),8-tetraen-17β-ol is dehydrogenated with palladium to form (±)-13-ethyl - 3 - methoxy-14β-gona-1,3,5(10),6,8-pentaen-17-one.

References Cited
UNITED STATES PATENTS
3,410,879  11/1968  Smith et al. _____ 260—397.45

ELBERT L. ROBERTS, Primary Examiner

U.S. Cl. X.R.
260—239.55, 397.3, 397.5, 999